Nov. 29, 1955     J. E. WALSTROM     2,725,486
METHOD AND APPARATUS FOR WELL LOGGING
Filed Dec. 9, 1952     3 Sheets-Sheet 1

INVENTOR
JOHN E. WALSTROM
BY
ATTORNEYS

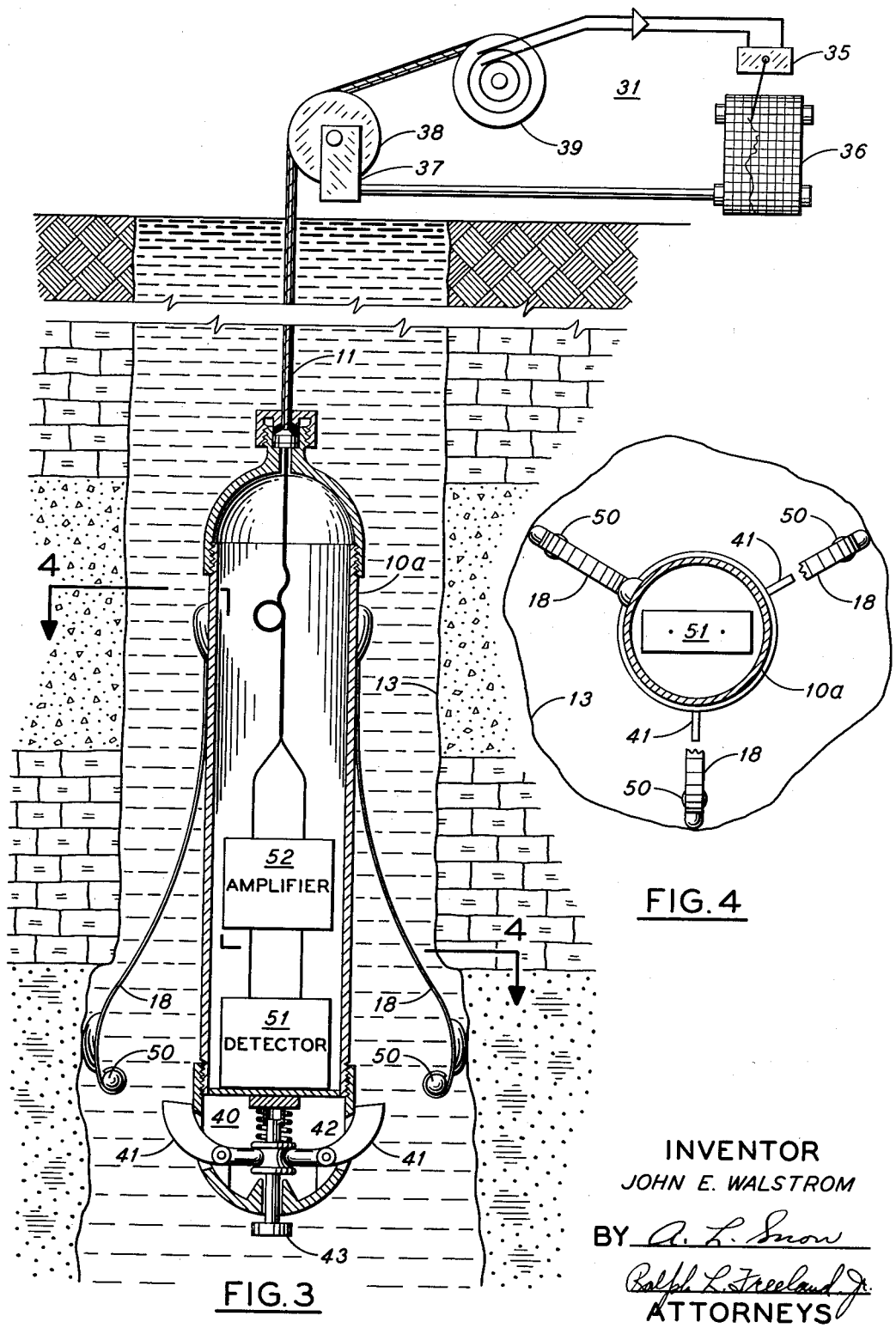

Nov. 29, 1955   J. E. WALSTROM   2,725,486
METHOD AND APPARATUS FOR WELL LOGGING
Filed Dec. 9, 1952   3 Sheets-Sheet 3

INVENTOR
JOHN E. WALSTROM
BY
ATTORNEYS

United States Patent Office 2,725,486
Patented Nov. 29, 1955

2,725,486

METHOD AND APPARATUS FOR WELL LOGGING

John E. Walstrom, Danville, Calif., assignor to California Research Corporation, San Francisco, Calif., a corporation of Delaware Application December 9, 1952, Serial No. 324,976

11 Claims. (Cl. 250—83.6)

This invention relates to a method of, and apparatus for, logging well bores and has for an object the provision of a method of logging a well bore in which a radiation detector traverses said well bore and a plurality of radioactive sources are simultaneously varied in distance from said detector in accordance with the radial variation in the cross-section of said well bore.

After the drilling of an oil well, it is frequently desired to have a continuous record of the variations in the transverse cross-sectional area of the well bore throughout its length. While, in some instances, the well bore may have a constant diameter throughout substantially its entire length, more frequently the cross-sectional area varies due to differences in the physical characteristics of the penetrated rocks. A knowledge concerning such variations of cross-sectional area is of great importance in the interpretation of other well logging records. For example, in the interpretation of electric logging records, it is necessary to know the cross-sectional variations of the well bore in order to evaluate properly the measured electrical characteristics, such as resistance and self-potential, which are directly affected by the nature and diameter of the drilling fluid column standing in the well bore. The volume of the drilling fluid column likewise affects the measured radiation recorded in gamma ray and neutron radioactivity logging. Additionally, in the setting of casing and cementing thereof in a well bore, it is necessary that the cross-sectional variations be known in order to calculate correctly the volume of cement required to reach a given, predetermined level between the casing and the wall of the well bore. Well caliper measurements and the recording thereof may also be used to determine the presence of filter cake opposite certain of the formations exposed in a well bore.

Heretofore, well bore calipering methods and apparatus have been known, in which the variations in the cross-sectional area of the well bore have been detected and measured by a mechanical recording device located in the well bore. In this type of apparatus a plurality of wall-engaging arms is connected through mechanical linkages to a mechanical recording device including a stylus and record sheet positioned inside a sealed chamber. Additionally, various forms of well calipering means have been provided in which a plurality of wall-engaging arms through mechanical linkages vary the electrical impedance of an induction coil or the resistance of a resistor. In both the mechanical and electrical calipering means there is inherently present possibility of mechanical slippage between the various linkages which transmit the movement of the wall-contacting arms and the movement-sensing device located and operated in the fluid column of the well bore containing drill cuttings and other contaminating materials.

In carrying out the method of the present invention and in a preferred form of apparatus, the foregoing difficulties are overcome by the provision of a radiation detector isolated from contact with the well bore and the fluids contained therein and traversing the well bore therewith. Further, in accordance with the invention, a plurality of radioactive sources, each of which is movable by, and in response to, the movement of a wall-engaging means, are movable simultaneously in response to radial or cross-sectional variations of the bore hole with respect to the radiation detector. In said preferred form of the invention, the radioactive sources are positioned for movement vertically with respect to the radiation detector and within a chamber containing a fluid having desirable radiation absorption characteristics, dissimilar to that of the drilling fluid in the well bore.

In another form of the invention said radioactive sources are movable radially with respect to the detector by positioning the sources adjacent the ends of the wall-engaging arms.

In both of the above forms of the invention the total intensity of the radiation from all of said sources is measured, recorded and correlated with respect to the depth of said detector in the well bore.

In another form of apparatus for carrying out the method of the invention, and particularly useful in determining the dip of strata traversed by the well bore, the radiation detecting means includes an individual detector of radioactivity for each of a plurality of radioactive sources. Each source is movable relative to its corresponding radiation detector in accordance with the radial movements of a wall-engaging arm adapted to follow the contours of the well bore. Isolation means are provided between the detectors and the radiation sources other than those associated together to prevent interaction of the sources and the detectors. The intensity of the radiant energy impinging upon the individual detectors is recorded by a plurality of recording devices corresponding to the individual detectors so that individual variations in intensity of radiation at each detector may be correlated with information regarding the orientation of the tool with respect to the traversed strata.

Further objects and advantages of the present invention will become apparent from the following detailed description taken in conjunction with the accompanying drawings which form an integral part of the present specification.

In the drawings:

Fig. 3 is a schematic representation of another form of apparatus useful in carrying out the method of the present invention and shows a vertical cross-sectional view of a logging tool.

Fig. 4 is a cross-sectional plan view in the direction of arrows 4—4 in Fig. 3.

Figures 1, 2:
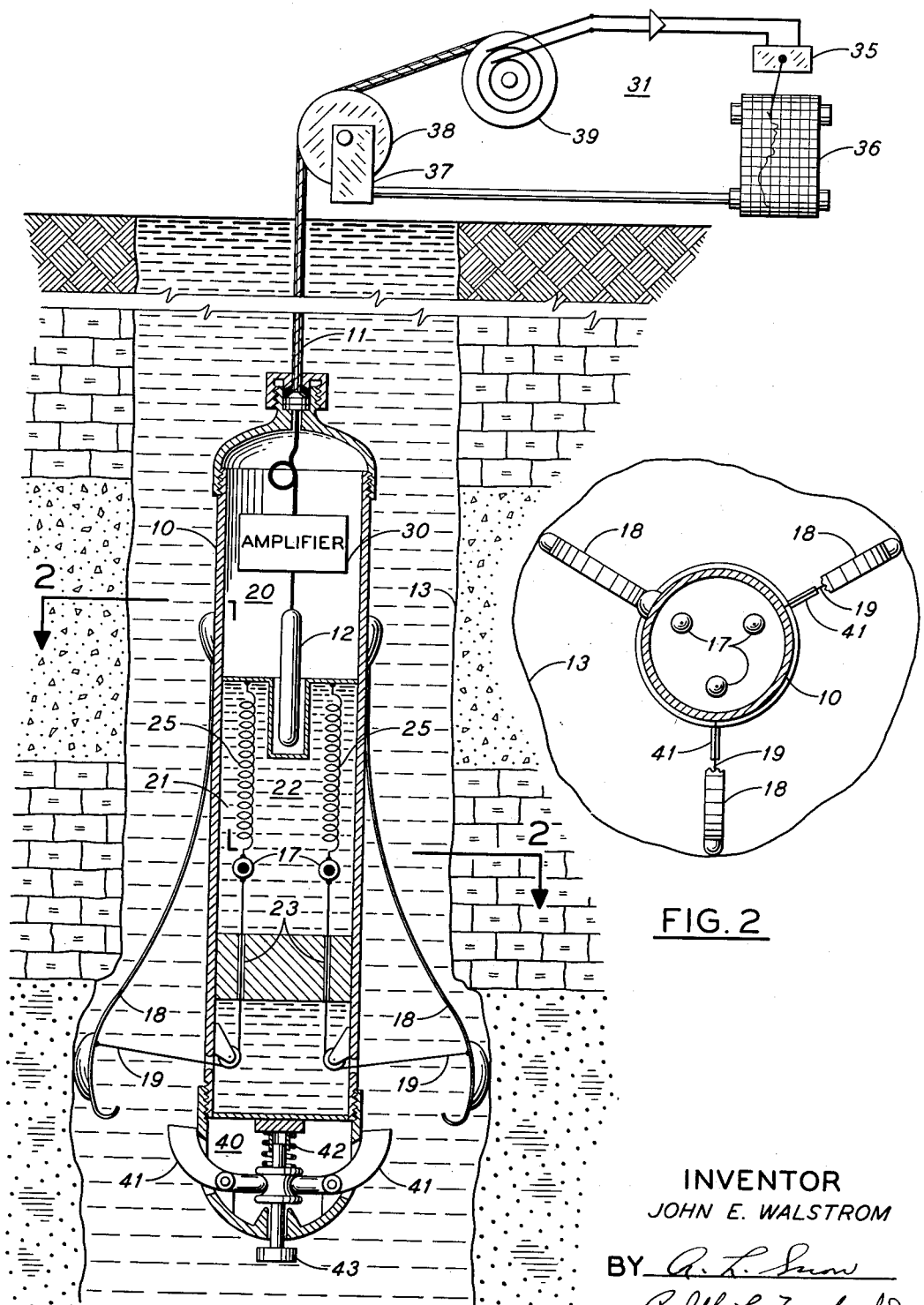
Fig. 1 is a schematic representation of a preferred form of apparatus for carrying out the method of the present invention and illustrates a vertical, cross-sectional view of a caliper logging tool.
Fig. 2 is a cross-sectional plan view of the tool shown in Fig. 1 in the direction of arrows 2—2.

Referring now to the drawings and in particular to Fig. 1, there is illustrated a preferred form of the apparatus for carrying out the method of the present invention, in which a body member 10 of a well bore logging tool is arranged to traverse a well bore by raising and lowering of cable 11 to position a radiation detector 12 at a desired elevation in a well bore, designated generally as 13. Radiation detector 12 is arranged to be activated in response to the total radiant energy emitted from a plurality of radioactive sources 17, which, in the present arrangement, are moved vertically toward and away from detector 12 in response to the radial movements of a corresponding plurality of wall-engaging arms 18 operating through cable means 19. Arms 18 are biased outwardly into engagement with the walls of well bore 13 by virtue of the arms 18 being preformed to the illustrated configuration from flat, leaf-spring material.

It will be observed that the radiation detector, which in the present embodiment has been indicated as a Geiger-Mueller tube 12, is positioned in an upper portion 20 of the well logging body 10 so that the tube is substantially isolated from contact with the drilling fluid in well bore 13. As shown, the lower portion of detector tube 12 is located in a well or compartment extending down into a lower, or second, portion 21 of body 10 wherein the radioactive sources 17 are located.

In accordance with the present invention, lower portion 21 is preferably filled with a solution 22 which may be subjected to the same hydrostatic pressure as that existing in the well bore 13 through cable passageways 23. Solution 22 is provided in chamber 21 to prevent the invasion thereinto of drilling fluid and cuttings contained in the well bore. Since the drilling fluid in well bore 13 may contain various radioactivity absorbing media, it is desirable to prevent this fluid from entering chamber 21 where the radiant energy emitted by sources 17 could be dissipated prior to arrival at Geiger tube 12. Without dissipation the total quantity of radiation measured by the detector is proportional to the total of the squares of the distances of each of the sources 17 from tube 12.

As shown, radioactive sources 17 are movable in response not only to the radial movements of arms 18 through the action of cable means 19, but also to springs 25 which resiliently bias the sources toward detector 12.

It will be apparent that with movement of the wall-engaging arms 18 outwardly and inwardly from body 10, upon change in the cross-sectional area or the radius of curvature of well bore 13, the detectors will be correspondingly moved upward and downward with respect to the detector. While radiation sources 17 may be of any desired type, preferably the sources are compounded to emit predominantly gamma rays, and the total radiation arriving at detector 12 from each source will be proportional to the square length of the path therebetween. Accordingly, the total radiation measured by detector 12 will be proportional to the area of the cross-section of well bore 13. The total radiation energy measured by detector 12 is transmitted through cable 11 by amplifier 30. A record of this total energy correlated with respect to depth of tool 10 in well bore 13 is provided by recording means 31. Recorder 31 includes a recording galvanometer 35 arranged to receive signals from detector 12 through slip ring and brush assembly 39 and record the measured total radiation on chart 36. Chart 36 is synchronously driven through suitable reduction gearing 37 connected to the raising and lowering mechanism 38 for the well logging tool 10 and cable 11.

For the purpose of permitting the well logging tool 10 to be lowered to the bottom of the well bore without interference with irregularities in the side of well bore 13, there is provided a locking mechanism 40 for the wall-engaging arms 18. Locking mechanism 40 includes a plurality of pivoted arms 41 adapted to engage the ends of arms 18 and to hold said ends against the body of tool 10 until the tool strikes the bottom of well bore 13. As shown, locking arms 41 are biased by coil spring 42 so that the outer ends of arms 41 are turned inwardly toward the walls of tool 10. A bottom-hole operated plunger 43 is movable upwardly when tool 10 rests on the bottom against the bias of spring 42 to rotate the arms 41 in an outward direction to release the ends of wall-engaging arms 18. While the actuating mechanism for arms 41 has been illustrated as being operable by plunger 43, various other mechanical or electrical operating means for holding and releasing wall-engaging arms 18 may be used, including means such as an electrically operated solenoid, or an explosive charge adapted to rupture a mechanical link.

Referring now to Figs. 3 and 4, there is illustrated therein an alternative form of apparatus for performing the method of the present invention, in which the radioactive sources 50 are positioned adjacent the ends of wall-engaging arms 18. As distinguished from the foregoing embodiment of Figs. 1 and 2, it will be observed that the sources of radiant energy are movable in substantially a radial direction with respect to a detector 51 which, in the present instance, is preferably of the scintillation type. As in the arrangement of Fig. 1, the total radiant energy arriving at detector 51 from the plurality of sources 50 will vary directly with the cross-sectional area of well bore 13. It will be seen that detector 51 is likewise substantially isolated from the column of drilling fluid in well bore 13.

The total radiant energy measured by detector 51 may be correlated with the depth of detector 51 as determined by the depth of logging tool 10a in the well bore by the same recording arrangement 31 described hereinabove.

While the drilling fluid column between the plurality of radioactive sources 50 may contain absorbing media, the increased sensitivity of a detector of the scintillation type, which is employed in the arrangement of Fig. 3, permits the radial movements of arms 18 to be measured without loss of sensitivity at recording means 31. In the operation of logging tool 10a, wall-engaging arms 18 are held against the side of the tool during the initial positioning of the tool at the bottom of the well bore by operation of locking device 40, and release of arms 18 is effected by the striking of plunger 43 on the bottom of the borehole, as described hereinabove in connection with the operation of the apparatus of Fig. 1.

Figures 5A, 5B, 6, 7:
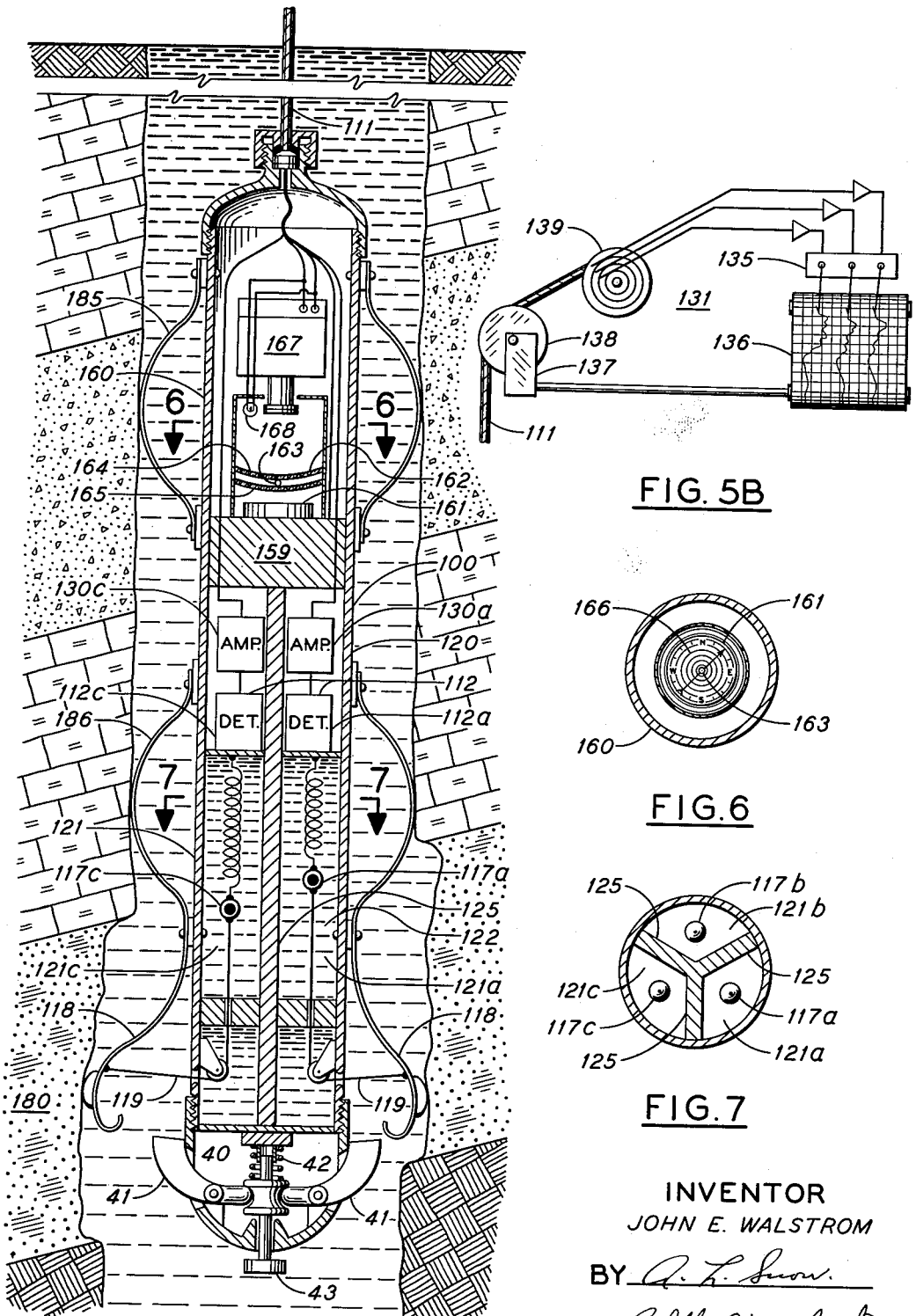
Fig. 5A is a schematic representation of another form of apparatus particularly useful in dip logging of strata traversed by a well bore, including a vertical cross-sectional view of the logging tool.
Fig. 5B is an upward extension of the arrangement shown in Fig. 5A and particularly illustrates the surface recording equipment for the apparatus of Fig. 5A.
Fig. 6 is a cross-sectional plan view of the body of the logging tool shown in Fig. 5, taken in the direction of arrows 6—6.
Fig. 7 is a cross-sectional plan view of another portion of the body of the logging tool shown in Fig. 5, taken in the direction of arrows 7—7.

Referring now to Figs. 5A and 5B, there has been illustrated therein another form of apparatus for carrying out the method of the invention in which the radiation detecting means, designated generally as 112, includes a plurality of individual detectors 112a, 112b and 112c, corresponding to each of a plurality of radioactive sources 117a, 117b and 117c. The arrangement of the detectors in the upper portion 120 of well logging tool 100 corresponds to the position of the radioactive sources 117a—117c located within compartments 121a, 121b and 121c, as seen in Fig. 7.

As in the arrangement of Fig. 1, the sources 117a—117c are respectively moved in response to the radial variations of arms 118 in following the vertical contour of the well bore. The radial movements of arms 118 are transmitted to the radioactive sources 117a—117c by cable means 119. Isolation means, such as the three walls 125, divide both the upper portion 120 and the lower portion 121 of tool 100 into three vertically elongated compartments. These walls prevent interaction of each radioactive source on any detectors other than the one directly above the source. For example, detector 112a is shielded by walls 125 from radiation emanating from sources 117b and 117c so that only radiations originating from source 117a will be sensed by detector 112a.

Alternatively, the individual sources and their associated detectors may be isolated by vertical superpositioning three chambers with shielding provided between each of the three chambers. In such an arrangement the detectors are sealed in separate compartments within the chambers, and the operating cables 119 extend through the shields to operate the sources.

The intensity of the radiant energy impinging upon the individual detectors is recorded by recording device 131, which includes a multi-trace oscillograph 135 adapted to record on chart 136 the radial movements of arms 118 in following the changes in cross-sectional area of the borehole. The drive of chart 136 is effected by reduction gearing 137 driven through driving means 138 for raising and lowering cable 111 and tool 100 in the borehole.

While the apparatus illustrated in Figs. 5A and 5B, as thus far described, is useful in performing the method of the present invention to determine the radial and cross-sectional changes in the borehole, there is additionally provided in tool 100 means for determining the angular departure and orientation of tool 100 with respect to strata traversed by the borehole as well as the angular departure and orientation of the well bore from a vertical position. This information, together with the individual traces recorded on chart 136, provides a means for determining both the direction and degree of the dip of strata traversed by the well bore. As shown in the upper portion of Fig. 5A and Fig. 7, there is provided in the upper portion 160 of well tool 100 a compass 161 for determining the orientation of tool 100 with respect to the earth's magnetic field. Directly above compass 161 there is positioned an inclinometer 162 comprising a ball 163 freely movable between two concave surfaces 164 and 165. As particularly illustrated in Fig. 7, concave surfaces 164 and 165 are preferably transparent and have provided therein a plurality of concentric rings, designated as 166, for measuring the angular displacement of ball 163 from true vertical. The position of the needle in compass 161 and the location of ball 163 may be recorded either continuously or intermittently by the operation of camera 167 and light 168. The operation of the apparatus for recording orientation and inclination of the well tool is particularly described in U. S. Patent 2,427,950, issued Seutember 23, 1947.

Briefly, operation of the apparatus shown in Figs. 5A and 5B to determine direction and degree of dip of strata is as follows. It will be observed that stratum 180, whose dip is to be determined, shows cavitation in the borehole wall and that the level at which the three equally-spaced arms 118 move outwardly to follow the contour of stratum 180 will be registered on record 136 on the individual traces corresponding to the difference in elevation resulting from the dip of stratum 180. With the individual traces correlated initially with respect to depth by virtue of chart 136, driven synchronously with tool 100, and subsequently correlated with the orientation and the inclination of the well tool, both the dip of structure 180 and the direction of that dip with respect to the vertical may be determined.

There is additionally illustrated in tool 100, as shown in Fig. 5A, upper and lower centering means, respectively designated as 185 and 186, which have one end secured by rivets to the well tool 100 at the locations indicated while the opposite ends are free to slidably engage the outer surface of well bore 100. While the centering means 185 and 186 have been illustrated only in the form of apparatus shown in Fig. 5A, it will be apparent that such centering means may be employed on tools of the type shown in Figs. 1 and 3.

Locking means for arms 118 are identical to that shown and described in connection with Fig. 1.

From the foregoing detailed description of three different forms of apparatus of carrying out the method of the present invention, it will be apparent that the present invention comprises broadly positioning a radiation detecting means in a well bore and, while traversing the well bore with said detector, varying the distances either radially or longiudinally between said detecting means and a plurality of radiation sources, each of which is movable in response to the cross-sectional changes in the area of the well bore, and correlating the total intensity of recorded radiation arriving at the detecting means with the depth of the detecting means in the well bore.

While various changes and modifications may be made in the forms of apparatus disclosed herein, as well as the method of operation, all such changes which fall within the scope of the appended claims are intended to be embraced thereby.

I claim:

1. The method of measuring variations in the cross-sectional area of a well bore comprising positioning a radiation detector and a plurality of radioactive sources at a predetermined level in said well bore, vertically traversing said well bore with said radiation detector and simultaneously varying the distance of each of said sources from said detector in accordance with the radial variations in the cross-sections of said well bore traversed by said detector, measuring the intensity of the radiant energy from said sources impinging on said detector and correlating the measured radiation intensity with the depth of said detector in said well bore.

2. A well logging tool comprising means for detecting gamma ray activity positioned within said tool, a plurality of gamma ray sources movable relative to said detecting means, means for moving said sources relative to said detector in response to variations in the magnitude of the cross-section of the well bore, and means for correlating the variations in gamma ray intensity as measured by said detecting means with the depth of said tool in a well bore.

3. A well bore logging tool comprising means for detecting radioactivity positioned in said tool, a plurality of sources of radioactivity movable with respect to said detecting means, a plurality of means for engaging the walls of a borehole, each of said plurality of radioactive sources being movable relative to said detector in accordance with the lateral displacement of one of said plurality of wall-engaging means when said means are in engagement with the walls of said borehole, and means for correlating the intensity of radioactivity measured by said detecting means with the depth of said tool in said well bore as a measurement of changes in the cross-sectional area of said well bore.

4. A borehole calipering tool comprising a plurality of wall-engaging arms resiliently biased for engagement with the peripheral walls of a borehole, radioactivity detector means positioned within the body of said tool and substantially isolated from contact with the fluids contained in said borehole, a radioactive source for each of said wall-engaging arms, each of said sources being movable relative to said detector means in response to variations in extent of deflection of its corresponding wall-engaging arm in contact with the peripheral walls of the borehole, and means for correlating the intensity of radioactivity measured by said detector means with the depth of said tool in said well bore as a measurement of changes in the cross-sectional area of said well bore.

5. The combination set forth in claim 4, in which each of said radioactive sources is positioned at the outer end of one of said wall-engaging arms, and said sources are moved substantially radially with respect to said detector means.

6. The combination set forth in claim 4, in which each of said radioactive sources is movable vertically with respect to said detector means and the motion of each of said wall-contacting arms is transmitted to its corresponding radioactive source by cable means.

7. The combination set forth in claim 4, in which said detector means includes a plurality of detectors, each of which corresponds to one of said radioactive sources and said correlating means includes an indicating means for each of said detectors.

8. A borehole logging tool for determining the dip of earth strata traversed by a borehole comprising at least three wall-engaging arms resiliently biased for movement into engagement with the peripheral walls of a well bore, a source of radioactivity for each of said arms, a radio-activity detecting means for each of said sources, each of said sources being movable relative to its corresponding detecting means in accordance with the extent of movement of its corresponding arm, means for detecting and recording the angular declination and orientation of the body of said logging tool in a well bore, means for individually recording the intensity of radioactivity measured by each of said detector means and means for correlating the individually recorded radioactivity and the orientation of said tool with the depth of said tool in a bore hole to determine the dip of strata traversed by said well bore.

9. A bore hole logging tool for detecting variations in the cross-section of a well bore comprising a body having a first portion thereof providing means for positioning radiation detecting means therein, substantially isolated from drilling fluid in said well bore, said body member having a second portion forming an enclosed chamber adapted to contain a fluid dissimilar in radiation absorption characteristics to drilling fluid, a plurality of radioactive sources disposed within said second portion of said body and in said dissimilar fluid for movement relative to said radiation detecting means, at least three wall-engaging arms supported by said body member and resiliently biased for movement into engagement with the wall of a well bore, means for transmitting radial movements of each of said arms to one of said radioactive sources, and means for correlating the intensity of radioactivity measured by said detecting means with the depth of said body in said well bore as a measurement of radial changes in the cross-section of said well bore.

10. A well bore logging tool in accordance with claim 9, in which said radiation detecting means includes a detector for each of said radioactive sources and said body member includes radiation shielding means for isolating each of said sources and its corresponding detector from other of said sources and said detectors and said correlating means includes indicating means for each of said detectors.

11. In a well logging tool for determining the direction of dip of strata traversed by a well bore, said logging tool including means for determining the orientation and angle of the well bore with respect to said strata and means for determining the orientation and angle of the well bore from a vertical position, the combination of a body member defining chamber means therein substantially isolated from contact with the well fluids contained in a well bore, a plurality of radioactivity detecting means positioned within said chamber and substantially isolated from each other, a corresponding plurality of radioactive sources movable relative to said detecting means, a wall-engaging arm for each of said radioactive sources resiliently biased for engagement with the peripheral walls of a borehole, means for transmitting radial movement of said arms to its corresponding radioactive source, means for recording the intensity of radioactivity measured by each of said detecting means with respect to the depth of said body member in said well bore, and means for correlating the individual records of radial variations in the cross-section of said well bore with the position of said well bore and said tool in the earth for determining the direction of dip of strata traversed by said well bore.

References Cited in the file of this patent

UNITED STATES PATENTS

| | | |
|---|---|---|
| 2,369,672 | Hare | Feb. 20, 1945 |
| 2,385,378 | Piety | Sept. 25, 1945 |
| 2,469,461 | Russell | May 10, 1949 |